(12) United States Patent
Chen et al.

(10) Patent No.: US 8,238,370 B2
(45) Date of Patent: Aug. 7, 2012

(54) METHODS FOR TRANSMITTING SYSTEM INFORMATION BIT STREAMS AND COMMUNICATION APPARATUSES UTILIZING THE SAME

(75) Inventors: Yih-Shen Chen, Hsinchu (TW); I-Kang Fu, Kaohsiung County (TW)

(73) Assignee: Mediatek Inc., Hsin-Chu (TW)

( * ) Notice: Subject to any disclaimer, the term of this patent is extended or adjusted under 35 U.S.C. 154(b) by 593 days.

(21) Appl. No.: 12/352,681

(22) Filed: Jan. 13, 2009

(65) Prior Publication Data

US 2009/0185543 A1 Jul. 23, 2009

Related U.S. Application Data

(60) Provisional application No. 61/021,645, filed on Jan. 17, 2008, provisional application No. 61/045,985, filed on Apr. 18, 2008.

(51) Int. Cl.
*H04J 3/24* (2006.01)
(52) U.S. Cl. ........................................ 370/473
(58) Field of Classification Search .......... 370/310–350, 370/431–432, 464, 471, 473, 475
See application file for complete search history.

(56) References Cited

U.S. PATENT DOCUMENTS

| | | | |
|---|---|---|---|
| 5,991,286 A | 11/1999 | Labonte et al. | |
| 2004/0202142 A1 | 10/2004 | Batariere et al. | |
| 2005/0107036 A1* | 5/2005 | Song et al. | 455/23 |
| 2007/0260851 A1 | 11/2007 | Taha et al. | |
| 2008/0014861 A1 | 1/2008 | Li et al. | |
| 2008/0072269 A1 | 3/2008 | Malladi et al. | |
| 2008/0198785 A1* | 8/2008 | Huang et al. | 370/312 |
| 2008/0267126 A1 | 10/2008 | Vujcic et al. | |
| 2009/0011718 A1 | 1/2009 | Chun et al. | |
| 2009/0016254 A1 | 1/2009 | Lee et al. | |
| 2009/0221293 A1* | 9/2009 | Petrovic et al. | 455/450 |
| 2010/0260164 A1* | 10/2010 | Moon et al. | 370/345 |

FOREIGN PATENT DOCUMENTS

| | | |
|---|---|---|
| JP | 8037678 | 2/1996 |
| JP | 2004349971 | 12/2004 |
| JP | 2007511975 | 5/2007 |
| JP | 2007243899 | 9/2007 |
| WO | 2007068304 | 6/2007 |
| WO | WO 2007/108630 | 9/2007 |

OTHER PUBLICATIONS

PCT Search Report mailed Apr. 23, 2009.

(Continued)

*Primary Examiner* — Ricky Ngo
*Assistant Examiner* — Wei-Po Kao
(74) *Attorney, Agent, or Firm* — Thomas|Kayden

(57) ABSTRACT

A method for transmitting system information bit streams of one or more base stations in a wireless communication system is provided. The method includes: identifying network-entry-related bit streams and non-network-entry-related bit streams from the system information bit streams, where the network-entry-related bit streams carry essential system information for a terminal to access a network through at least one of the base stations; modulating the network-entry-related bit streams according to a first set of modulation and coding schemes (MCSs) and modulating the non-network-entry-related bit streams according to a second set of MCSs; and transmitting the system information bit streams with different frequencies, where the network-entry-related bit streams are periodically transmitted according to a first pre-determined period.

27 Claims, 8 Drawing Sheets

OTHER PUBLICATIONS

English language translation of abstract of JP 8037678 (published Feb. 6, 1996).
English language translation of abstract of JP 2004349971 (published Dec. 9, 2004).
English language translation of abstract of JP 2007511975 (published May 10, 2007).
English language translation of abstract of JP 2007243899 (published Sep. 20, 2007).

* cited by examiner

METHODS FOR TRANSMITTING SYSTEM INFORMATION BIT STREAMS AND COMMUNICATION APPARATUSES UTILIZING THE SAME

CROSS REFERENCE TO RELATED APPLICATIONS

This application claims the benefit of U.S. Provisional Application No. 61/021,645 filed Jan. 17, 2008 and entitled "TREE-LIKE SYSTEM INFORMATION WITH DYNAMIC UPDATING FOR 802.16-LIKE SYSTEMS", and U.S. Provisional Application No. 61/045,985 filed Apr. 18, 2008 and entitled "NEW HIERARCHY OF SYSTEM INFORMATION DELIVERY IN MOBILE CELLULAR NETWORKS". The entire contents of which are hereby incorporated by reference.

BACKGROUND OF THE INVENTION

1. Field of the Invention

The invention relates to a method for transmitting a plurality of system information bit streams, and more particularly to a method for transmitting a plurality of system information bit streams with reduced signal overhead and network access time and improved spectrum efficiency.

2. Description of the Related Art

In a wireless communication system, a base station (as an example, a cellular tower) provides services to terminals in a geographical area. The base station usually broadcasts information to aid the terminals to identify necessary system information and service configurations so that the terminals can gain essential network entry information and determine whether to use the service provided by the base station.

However, in WiMAX (Worldwide Interoperability for Microwave Access) communication systems, or IEEE 802.16-like systems, unstructured system information usually includes huge overhead and is broadcast in an irregular manner, which causes inefficient bandwidth usage and unpredictable and lengthy network entry time of the terminals. Thus, a novel hierarchical system information delivery method for wireless communication systems is highly required.

BRIEF SUMMARY OF THE INVENTION

Communication apparatuses and methods for transmitting system information bit streams, wherein each system information bit stream carries corresponding system information of one or more base stations in a wireless communication system are provided. An embodiment of such a method comprises: identifying a plurality of network-entry-related bit streams and a plurality of non-network-entry-related bit streams from the system information bit streams, wherein the network-entry-related bit streams carry essential system information for a terminal to access a network through at least one of the base stations, and wherein the network-entry-related bit streams are categorized into one group and the non-network-entry-related bit streams are categorized into the other group; modulating the network-entry-related bit streams according to a first set of modulation and coding schemes (MCSs) and modulating the non-network-entry-related bit streams according to a second set of MCSs, wherein each of the first set of MCSs and the second set of MCSs comprise one or more MCSs, respectively; and transmitting the system information bit streams with different frequencies, wherein the network-entry-related bit streams are periodically transmitted according to a first predetermined period.

Another embodiment of such a method comprises: obtaining a preferred broadcast period for each system information bit stream; identifying at least one high-rate bit stream and at least one low-rate bit stream from the system information bit streams according to the preferred broadcast period, wherein the preferred broadcast period of the high-rate bit stream is based on one frame unit and the preferred broadcast period of the low-rate bit stream is based on multiple super-frames unit; and modulating the high-rate bit stream according to a first set of modulation and coding schemes (MCSs) and modulating the low-rate bit stream according to a second set of MCSs, wherein the first set of MCSs and the second set of MCSs comprises at least one MCS, respectively.

Another embodiment of a communication apparatus capable of providing system information broadcasting in a wireless communication system comprises: a memory storing a plurality of network-entry-related bit streams that carry essential system information for a terminal to access the network, and a plurality of non-network-entry-related bit streams; and a processor coupled to the memory, modulating the network-entry-related bit streams according to a first set of modulation and coding schemes (MCSs), modulating the non-network-entry-related bit streams according to a second set of MCSs, and transmitting the network-entry-related bit streams according to a first predetermined period, wherein the first set of MCSs and the second set of MCSs comprise at least one MCS, respectively.

Another embodiment of a communication apparatus comprises: a radio transceiver module; and a processor receiving a plurality of network-entry-related bit streams and a plurality of non-network-entry-related bit streams via the radio transceiver module, and demodulating the received network-entry-related bit streams according to a first set of modulation and coding schemes (MCSs) and demodulating the received non-network-entry-related bit streams according to a second set of MCSs.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
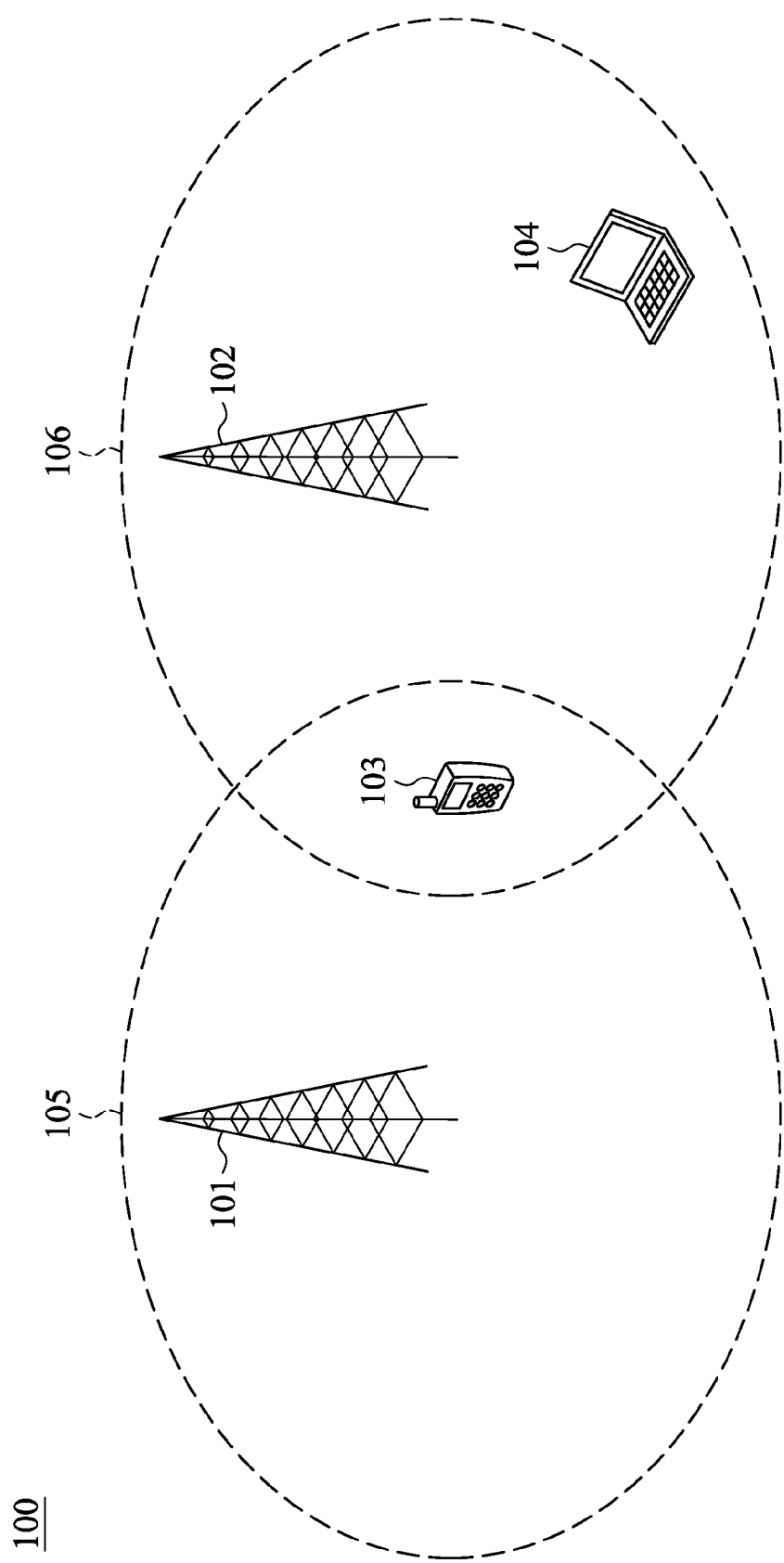
FIG. 1 shows an exemplary network topology of a wireless communication system according to an embodiment of the invention.

FIG. 1 shows an exemplary network topology of a wireless communication system according to an embodiment of the invention. As shown in FIG. 1, the wireless communication system 100 comprises one or more base stations 101 and 102 in one or more sectors 105 and 106 that receive, transmit, repeat, etc., wireless communication signals and provide services to each other and/or to one or more mobile devices 103 and 104. According to an embodiment of the invention, mobile device may be a mobile phone, a computer, a notebook, a PDA, a CPE . . . etc., and thus, the invention should not be limited thereto. Base stations 101 and 102 may be connected to an infrastructure network (e.g. the Internet) and, therefore, provide connectivity to the Internet. According to one embodiment of the invention, base stations 101 and 102 may facilitate peer-to-peer communication service (e.g. communication directly between mobile devices 103 and 104). According to the embodiment of the invention, the wireless communication system 100 may be configured as a WIMAX communication system or adopt technologies based on the IEEE 802.16 standard.

Figure 2:
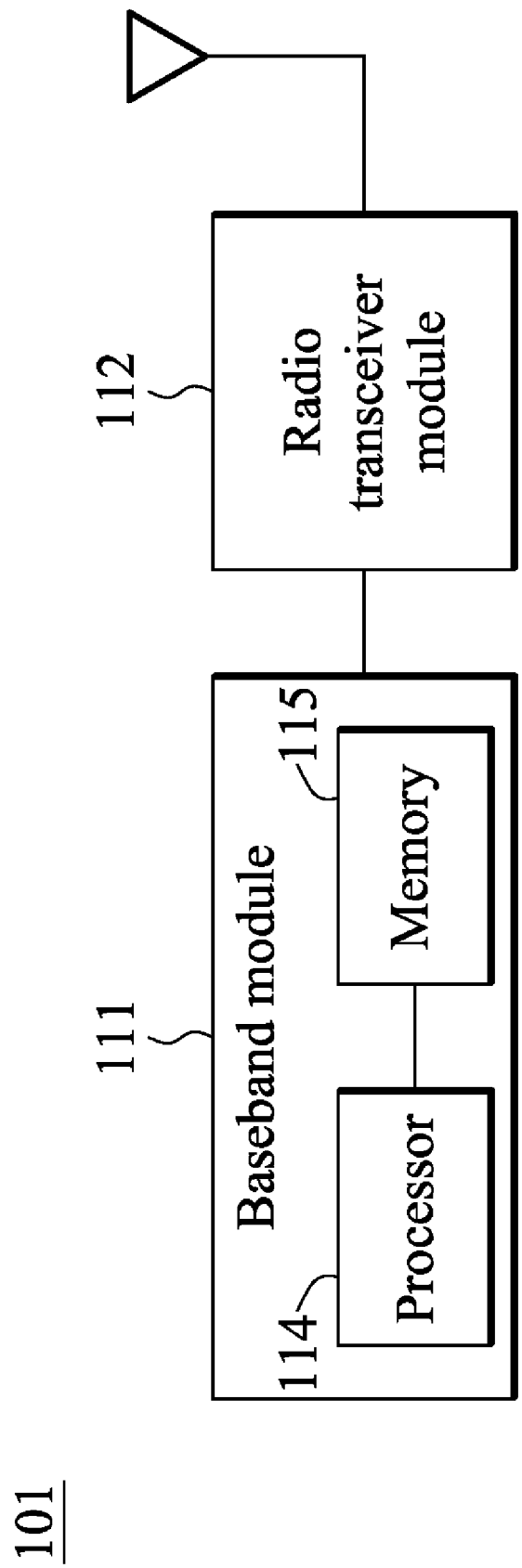
FIG. 2 shows a schematic view of a base station according to an embodiment of the invention.

FIG. 2 shows a schematic view of a base station according to an embodiment of the invention. The base station 101 may comprise a baseband module 111 and a radio transceiver module 112. The radio transceiver module 112 may comprise an antenna, a receiver chain to receive wireless radio frequency signals and convert the received signals to baseband signals to be processed by the baseband module 111, and a transmitter chain to receive baseband signals from the baseband module 111 and convert the received signals to wireless radio frequency signals to be transmitted. The radio transceiver module 112 may comprise a plurality of hardware devices to perform radio frequency conversion. The baseband module 111 further converts the baseband signals to a plurality of digital signals, and processes the digital signals, and vice versa. The baseband module 111 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 111 further comprises a processor 114 and a memory 115. In order for the mobile devices 103 and 104 to access base stations 101 and 102 and use the services offered or to utilize the spectrum for wireless communications, base stations 101 and 102 broadcast certain system information. The memory 115 may store the system information of the base station 101, and further store a plurality of software/firmware code or instructions to provide and maintain wireless communication services. The processor 114 executes the code or instructions stored in the memory 115 and controls the operations of memory 115, the baseband module 111 and the radio transceiver module 112.

Figure 3:
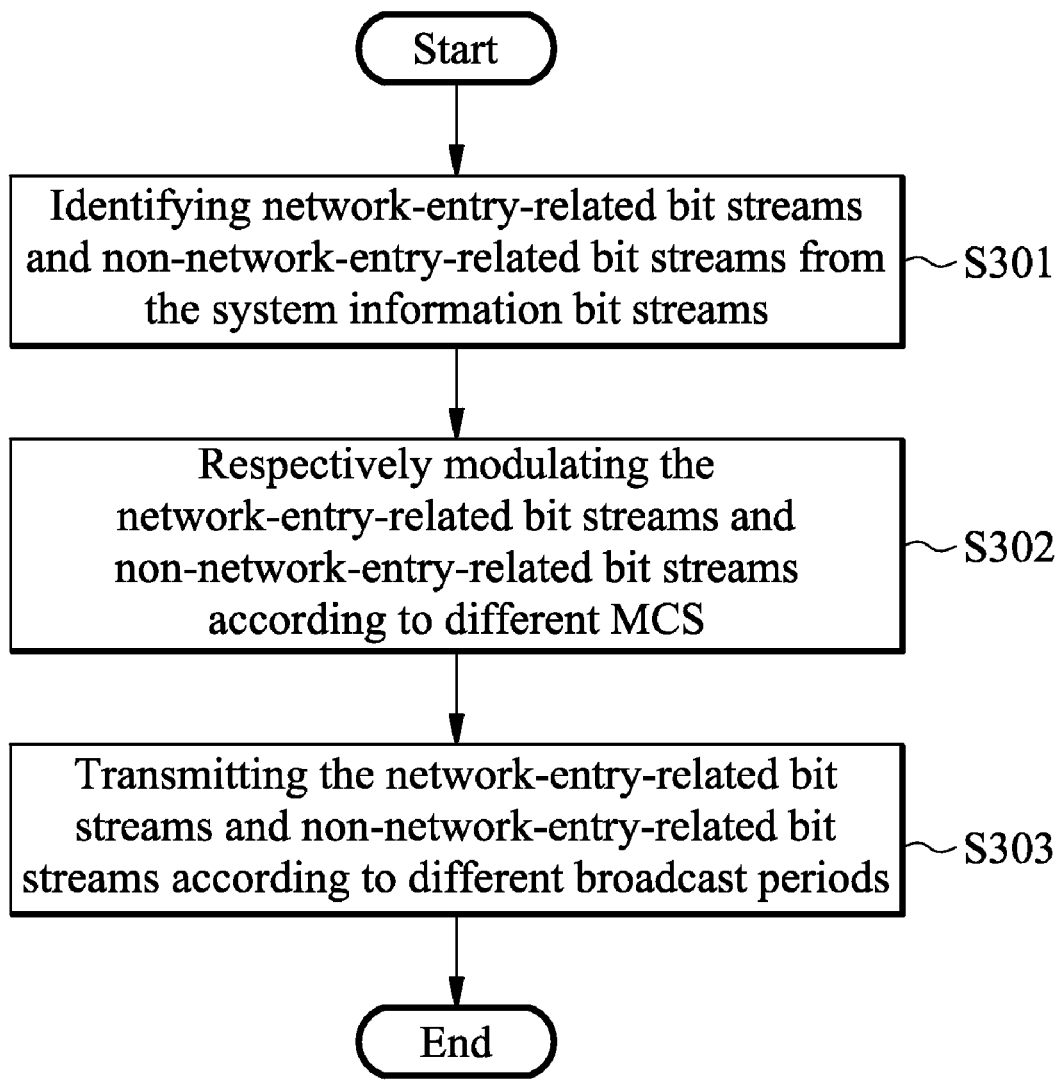
FIG. 3 shows a flow chart of a method for transmitting a plurality of system information bit streams according to a first embodiment of the invention.

According to an embodiment of the invention, the system information may be categorized, modulated differently, and transmitted according different broadcast periods so as to mitigate signal overhead and improve the spectrum efficiency and bandwidth efficiency. FIG. 3 shows a flow chart of a method for transmitting a plurality of system information bit streams according to a first embodiment of the invention. It should be noted that the steps illustrated in the following flow charts may be implemented as software/firmware code or instructions and stored in the memory to be executed by the processor of the base station. Firstly, the processor (e.g. 114) identifies network-entry-related bit streams and non-network-entry-related bit streams from the system information bit streams (Step S301). The network-entry-related bit streams may be system information bit streams that carry essential system information for a terminal (e.g. mobile device 103 or 104) to access a network through one of the base stations in the wireless network, and the non-network entry related bit streams may be the remaining system information bit streams. As an example, essential system information for network access carries critical information should be broadcasted every superframe, which may comprise information indicating a cell type, super frame number, change count, allocation information of non-network-entry-related information, UL loading indicator, etc. Next, the processor respectively modulates the network-entry-related bit streams and non-network-entry-related bit streams according to different modulation and coding scheme (MCS) (Step S302). According to the embodiment of the invention, the network-entry-related bit streams may be modulated according to a first set of MCSs and the non-network-entry-related bit streams may be modulated according to a second set of MCSs, wherein each of the first set of first MCSs and the second set of second MCSs comprise one or more MCSs, respectively, and wherein at least one MCS in the first set of MCSs is different from at least one MCS in the second set of MCSs. Further, according to the embodiment of the invention, at least one MCS of the first set of MCSs defines a first bit rate lower than a second bit rate defined by at least one MCS of the second set of MCSs. As an example, since the network-entry-related bit streams carry essential system information for network access, a bit rate of the first MCS (QPSK with R=½) of the first set of MCSs may be lower than a bit rate of the second MCS (QPSK with R=¾) of the second set of MCSs so as to provide a more robust coding scheme. According to an embodiment of the invention, the first set of MCSs and the second set of MCSs may be adaptively changed according to a condition of cell-planning, terminal locations, or terminal feedbacks. Finally, the processor transmits the network-entry-related bit streams and non-network-entry-related bit streams according to different broadcast periods (Step S303). As an example, since the network-entry-related bit streams carry essential system information for network access, the network-entry-related bit streams may be periodically transmitted according to a first predetermined period and the non-network-entry-related bit streams may be periodically transmitted according to a second predetermined period, wherein the first predetermined period is shorter than the second predetermined period so as to reduce network access time spent when waiting for necessary system information of mobile devices. According to another embodiment of the invention, the processor may also determine corresponding transmission time instance for each non-network-entry-related bit stream in an indication message. Thus, the non-network-related bit streams may also be transmitted in a non-periodically manner. Next, the base station may further transmit the non-network-entry-related bit streams at the corresponding transmission time instances. The indication message may be periodically transmitted by the base station (e.g. 101 or 102)

according to an indication period so as to inform the mobile devices when to receive the corresponding non-network-entry-related bit streams.

Figure 4:
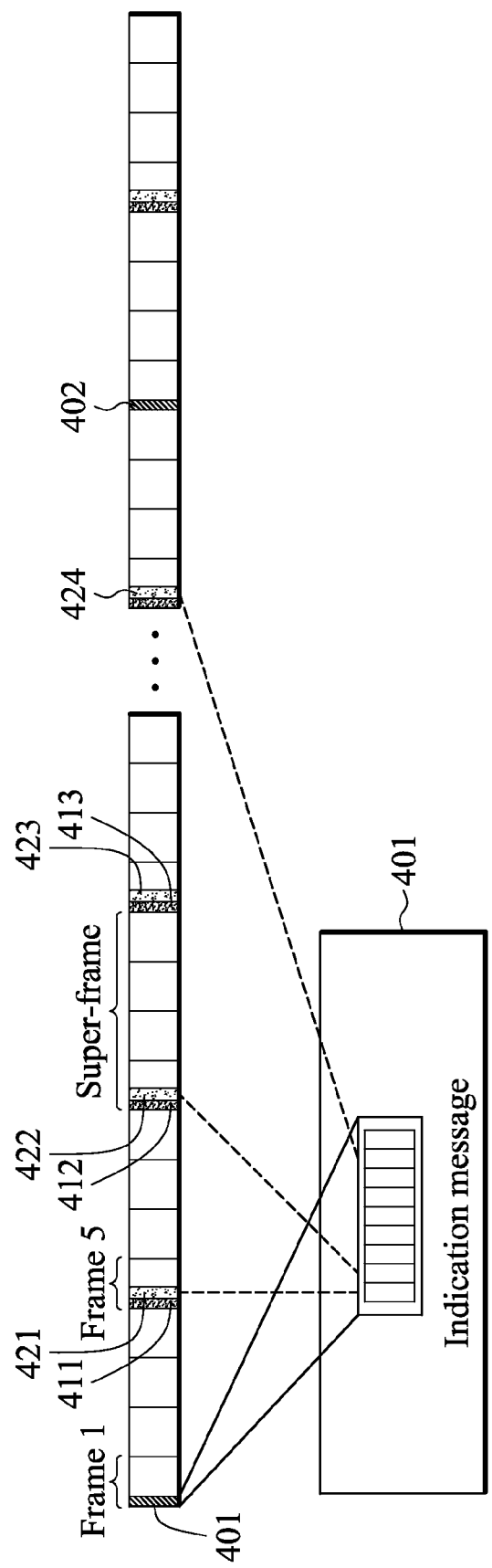
FIG. 4 shows a schematic view of the transmission schedule of the system information bit streams according to an embodiment of the invention.

FIG. 4 shows a schematic view of the transmission schedule of the system information bit streams according to an embodiment of the invention. As shown in FIG. 4, indication messages 401 and 402 and network-entry-related system information bit streams 411, 412, 403 . . . are broadcasted periodically. Indication message comprises information indicating corresponding transmission time instances of the remaining system information bit streams. As can be seen, the indication message 401 points out in which frame that the non-network-entry-related bit streams 421, 422, 423, 424, . . . etc. will be broadcasted. Once the mobile device receives the indication message, it can find out the transmission time instances of the 'to be broadcasted' system information and determine when to wake up to receive it. According to another embodiment of the invention, MS may also determine the time to receive the system information of scanned base station by the indication message.

Figure 5:
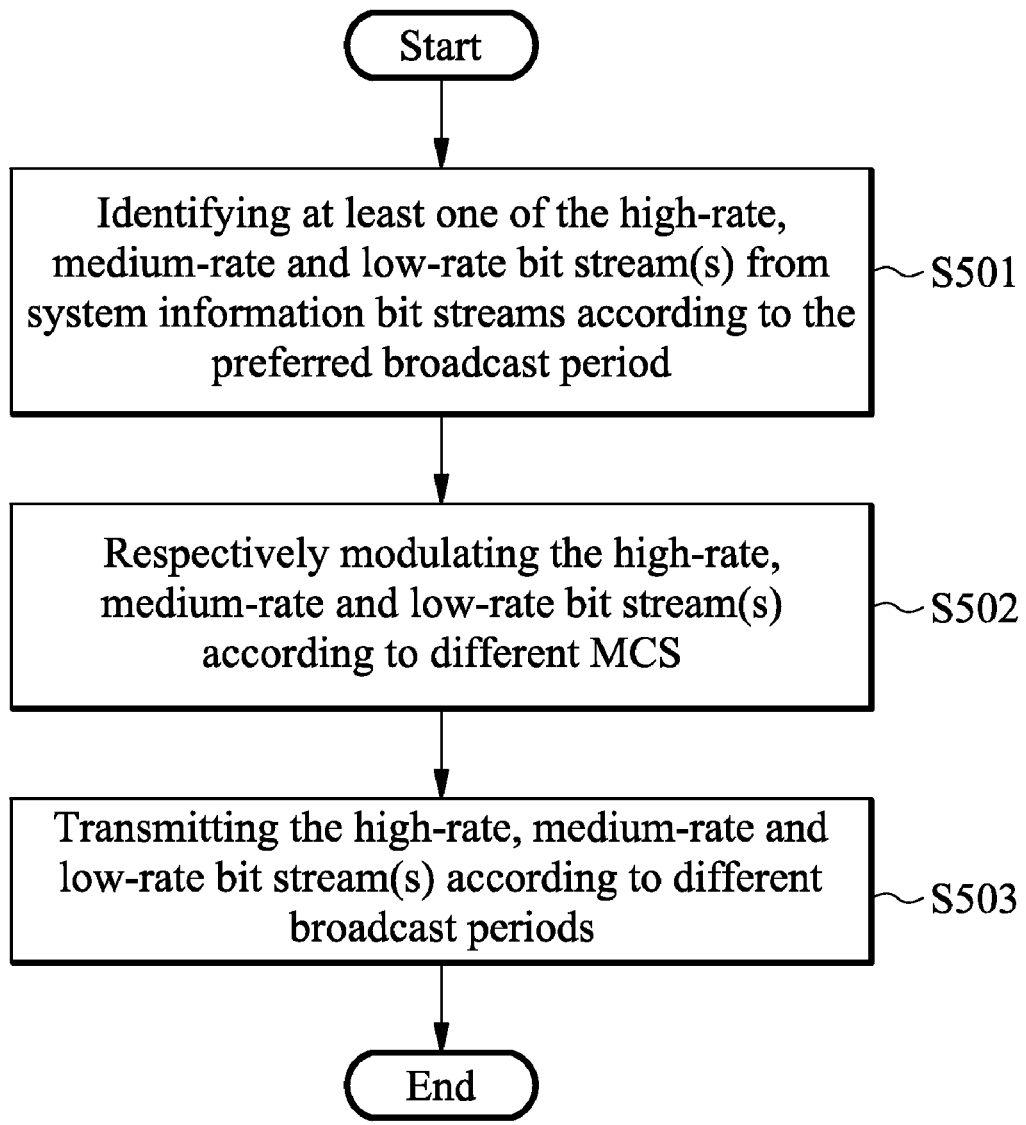
FIG. 5 shows a flow chart of a method for transmitting a plurality of system information bit streams according to a second embodiment of the invention.

According to a second embodiment of the invention, the system information may also be categorized according to the broadcast period (frequency). FIG. 5 shows a flow chart of a method for transmitting a plurality of system information bit streams according to a second embodiment of the invention. The base station may obtain a preferred broadcast period for each system information bit stream in advance, wherein the preferred broadcast period represents a period (or frequency) that the system information bit stream is preferably to be broadcasted or to be transmitted so as to maintain the quality of the provided wireless communication service. As an example, the preferred broadcast period may be determined in advance by the operators, or may be predefined by corresponding standards. After obtaining the preferred broadcast periods, the processor (e.g. 114) identifies at least one of the high-rate bit stream(s), medium-rate bit stream(s) and low-rate bit stream(s) from the system information bit streams according to the preferred broadcast period (Step S501). According to the embodiment of the invention, as an example, the preferred broadcast period of the high-rate bit stream is based on one frame unit (e.g. 1 frame, 2 frames . . . etc.), the preferred broadcast period of the medium-rate bit stream is based on one super-frame unit (e.g. 1 super-frame), wherein a super-frame may be defined as multiple frames (e.g. 1 super-frame comprising of 4 frames), and the preferred broadcast period of the low-rate bit stream is based on multiple super-frames unit (e.g. 2 super-frames, 3 super-frame . . . etc.). Next, the high-rate, medium-rate and low-rate bit streams are respectively modulated according to different MCS (Step S502). As an example, the high-rate bit streams are preferably transmitted more frequently than the medium-rate and low-rate bit streams, which may mean that the high-rate bit streams may carry important information that are generally required by most of the mobile devices. Thus, the bit rate for modulating the high-rate bit streams may be designed to be lower than that of the medium-rate and low-rate bit streams so as to provide a more robust coding scheme. Next, the processor transmits the high-rate, medium-rate and low-rate bit streams according to different broadcast periods (Step S503). As an example, the processor may transmit the high-rate, medium-rate and low-rate bit streams according to the corresponding preferred broadcast period. As another example, the processor may also unicast, instead of broadcast, the low-rate bit stream so as to further preserve the transmission bandwidth. Meanwhile, the processor may unicast the low-rate bit stream actively, or in response to reception of a corresponding information request message from a terminal (mobile device). The information request message may be actively transmitted by the mobile device so as to actively request system information instead of waiting for a long time period (e.g. multiple super-frames). For example, because a mobile device may usually not need to know the handover related parameters when trying to access the network, or may not need to know the hybrid automatic repeat request (HARQ) related parameters when HARQ is not supported by the mobile device, the handover related parameters, and HARQ related parameters may be unicasted in response to reception of a corresponding information request message. Thus, the overhead of medium access control (MAC) layer is reduced and so as the bandwidth consumption.

Figure 6:
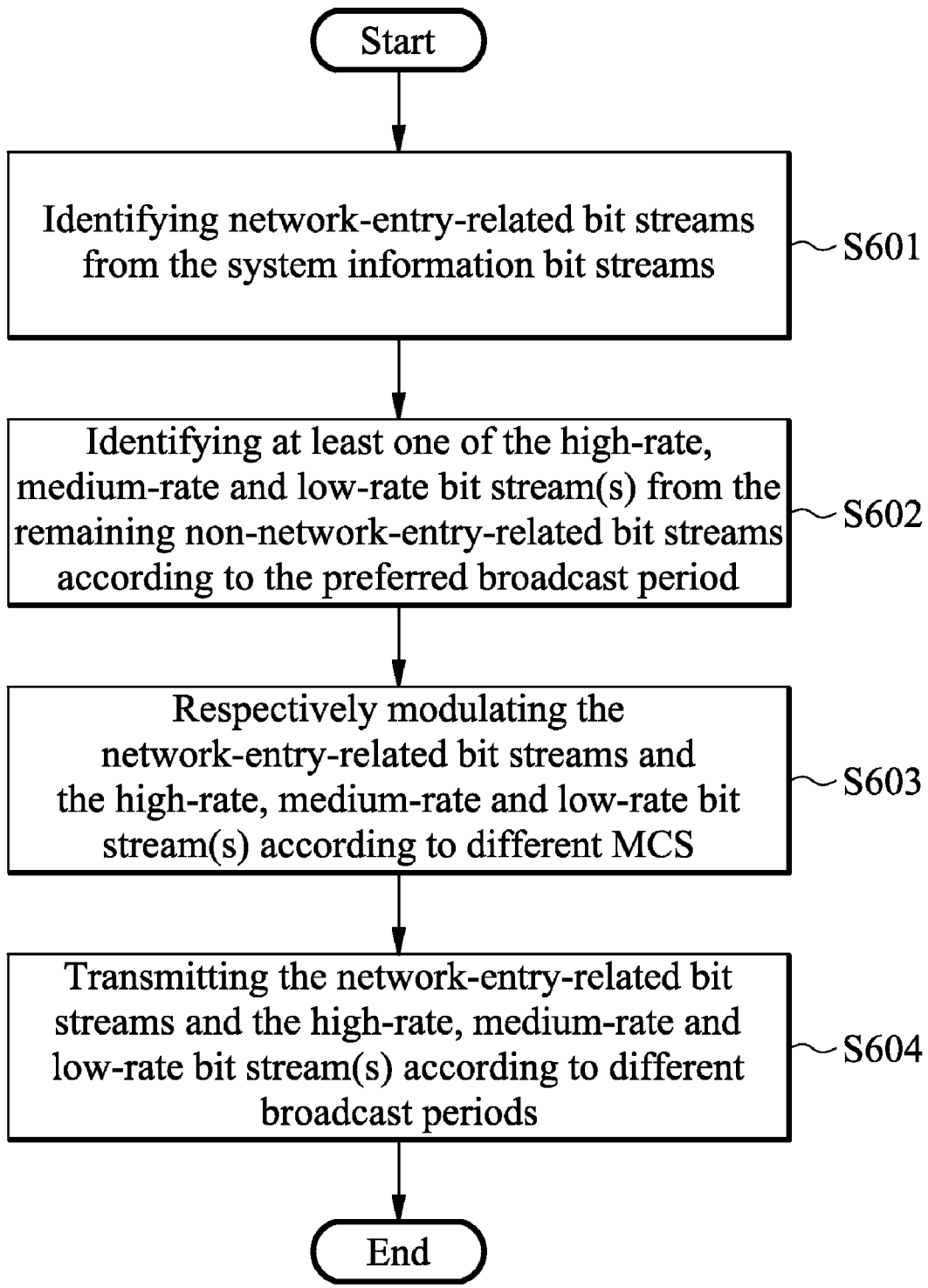
FIG. 6 shows a flow chart of a method for transmitting a plurality of system information bit streams according to a third embodiment of the invention.

According to a third embodiment of the invention, the system information may also be categorized according to both of the network entry related property and the broadcast frequency. FIG. 6 shows a flow chart of a method for transmitting a plurality of system information bit streams according to a third embodiment of the invention. Firstly, the processor (e.g. 114) identifies network-entry-related bit streams from the system information bit streams (Step S601). Next, the processor identifies at least one of the high-rate, medium-rate and low-rate bit stream(s) from the remaining non-network-entry-related bit streams according to the preferred broadcast period (Step S602). Next, the processor respectively modulates the network-entry-related bit streams and the high-rate, medium-rate and low-rate bit stream(s) according to different modulation and coding schemes (MCS) (Step S603). As an example, the bit rate for modulating the network-entry-related bit streams may be designed lower than that of the non-network-entry-related bit streams, and the bit rate for modulating the high-rate bit streams may be designed lower than that of the medium-rate and low-rate bit streams. Next, the processor transmits the network-entry-related bit streams and the high-rate, medium-rate and low-rate bit streams according to different broadcast periods (Step S604). As previously described, the network-entry-related bit streams may be periodically transmitted according to a shorter predetermined period so as to reduce network access time spent when waiting for necessary system information of the mobile devices. Further, the processor may transmit the high-rate, medium-rate and low-rate bit streams according to the corresponding preferred broadcast period. The corresponding transmission time instances for each non-network-entry-related bit stream may also be indicated in an indication message. As another example, the processor may also unicast, instead of broadcast, the low-rate bit stream actively or in response to reception of a corresponding information request message from a terminal (mobile device) so as to further preserve transmission bandwidth.

According to another embodiment of the invention, when the content of one system information is static, as an example, substantially unchanged over a long period of time, the corresponding system information bit streams may also be transmitted via more than one base station (e.g. 101 and 102) by using macro-diversity technology. For example, public land mobile network identity (PLMN ID), downlink/uplink ratio . . . etc. may be substantially unchanged and common over more than one base station, and may be carried on the same subcarriers and transmitted via more than one base station at the same time instance and same radio frequency. The mobile devices (e.g. 103 or 104) may respectively receive the corresponding system information bit stream from multiple base stations, combine the received system information bit stream, and decode the combined bit stream to obtain the carried system information.

Figure 7:
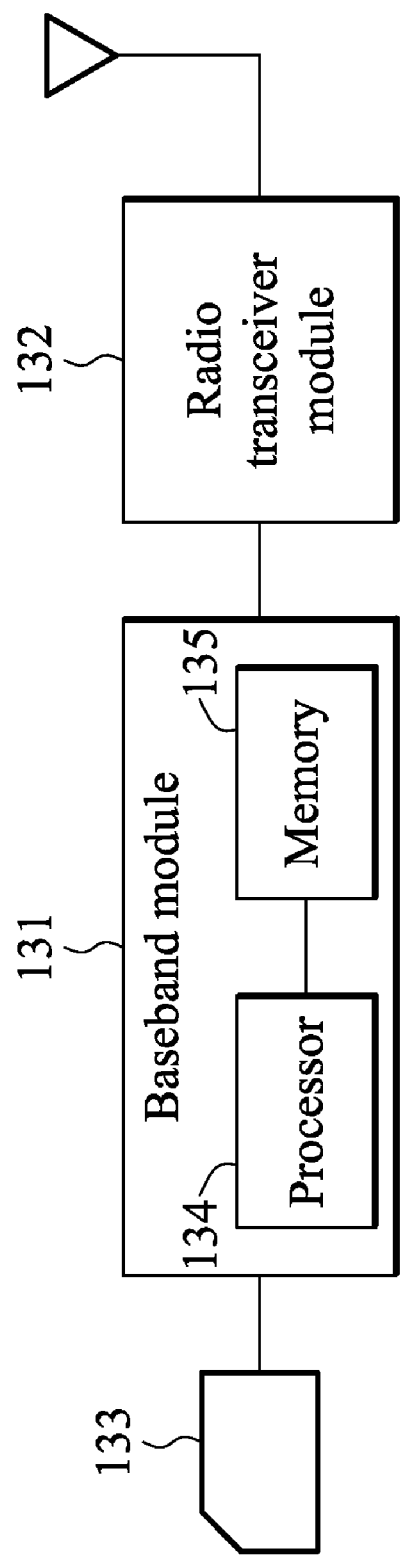
FIG. 7 shows a schematic view of a mobile device according to an embodiment of the invention.

FIG. 7 shows a schematic view of a mobile device according to an embodiment of the invention. The mobile device 103 may comprise a baseband module 131, a radio transceiver module 132 and selectively comprise a subscriber identity card 133. The radio transceiver module 132 receives wireless radio frequency signals, converts the received signals to baseband signals to be processed by the baseband module 131, or receives baseband signals from the baseband module 131 and converts the received signals to wireless radio frequency signals to be transmitted to a peer device. The radio transceiver module 132 may comprise a plurality of hardware devices to perform radio frequency conversion. For example, the radio transceiver module 132 may comprise a mixer to multiply the baseband signals with a carrier oscillated in the radio frequency of the wireless communication system. The baseband module 131 further converts the baseband signals to a plurality of digital signals, and processes the digital signals, and vice versa. The baseband module 131 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 131 further comprises a memory device 135 and a processor 134. The memory 135 may store a plurality of software/firmware code or instructions to maintain the operation of the mobile device. It is to be noted that the memory device 135 may also be configured outside of the baseband module 131 and the invention should not be limited thereto. The processor 134 executes code or the instructions stored in the memory 135 and controls the operations of the baseband module 131, the radio transceiver module 132, and the plugged subscriber identity card 133, respectively. The processor 134 may read data from the plugged subscriber identity card 133 and writes data to the plugged subscriber identity card 133. It is also to be noted that the mobile device 103 may also comprise another type of identity module instead of the subscriber identity card 133 and the invention should not be limited thereto.

According to the embodiment of the invention, since the system information has been categorized, the processor (e.g. 134) of the mobile device may receive the periodically transmitted network-entry-related bit streams at the corresponding time instances and receive at least one indication message comprising information indicating corresponding transmission time instances for the non-network-entry-related bit streams via the radio transceiver module (e.g. 132). After obtaining the corresponding transmission time instances by decoding the indication message, the processor may further receive the non-network-entry-related bit streams at the corresponding transmission time instances via the radio transceiver module. Next, the processor further demodulates the received network-entry-related bit streams according to the first set of MCSs and demodulates the received non-network-entry-related bit streams according to the second set of MCSs. As an example, the base station (e.g. 101 or 102) may broadcast a downlink message in superframe header, containing at least one of a Primary Broadcast Channel (PBCH) burst, Secondary Broadcast Channel (SBCH) burst and an indication message, wherein both of the PBCH and SBCH may contain network-entry-related system information and wherein the system information carried in the SBCH burst may further be categorized according to the embodiments as previously described above. In addition, the PBCH burst may be modulated according to a predefined MCS while the SBCH may be modulated flexibly according to a predetermined MCS indicated in the PBCH burst. The mobile device receives and decodes the downlink message to obtain the PBCH burst, the SBCH burst, and the indication message. Next, the mobile device may further receive and demodulate/decode other PBCH bursts, SBCH bursts and/or the non-network-entry-related bit streams (or high-rate, medium-rate and low-rate bit streams) at the corresponding time instances according to the indication message.

According to another embodiment of the invention, when the content of one system information is static, as an example, substantially unchanged over a long period of time, such as the BSID, PLMN ID . . . etc., the corresponding system information bit streams that carry the same static system information may also be received at different time instances by the mobile device. After receiving multiple system information bit streams carrying the same system information at different time instances, the mobile station combines the received system information bit streams by using a combining technique to obtain a combined bit stream, and then decodes the combined bit stream to obtain the carried system information. In one embodiment, the combining technique is soft combining. In this way, the system information, which may not have been correctly decoded at a previous time, may be correctly decoded at this time with the aid of the currently received bit streams. In another embodiment, the combining technique is repetition combining, where the information bit streams are transmitted with repetition in a burst.

Figure 8:
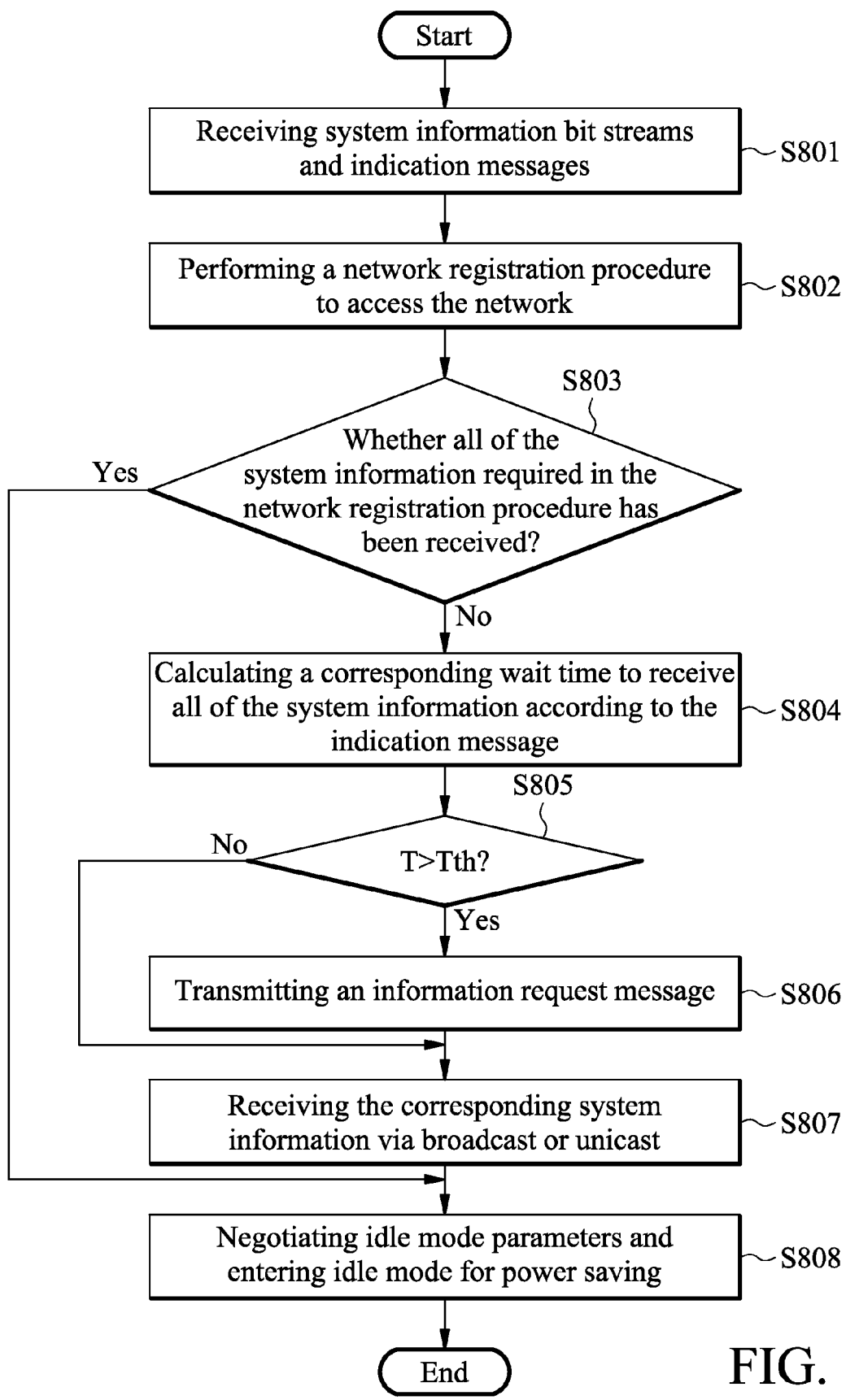
FIG. 8 shows a flow chart of a fast network access procedure of a mobile device benefiting from system information categorization according to an embodiment of the invention.

FIG. 8 shows a flow chart of a fast network access procedure of a mobile device benefiting from system information categorization according to an embodiment of the invention. After the mobile device is powered on and synchronized with preamble, the mobile device receives system information bit streams (e.g. network-entry-related bit streams) and/or indication messages (e.g. 401 as shown in FIG. 4) that are broadcasted by one or more base stations (Step S801). Next, the processor (e.g. 134) starts to perform a network registration procedure to access the network provided by the base stations (Step S802). Next, the processor determines whether all of the system information required by the network registration procedure has been received (Step S803). When there is still some remaining system information that hasn't been acquired, the processor further calculates a corresponding wait time (T) to receive all of the system information according to the corresponding transmission time instances as indicated in the indication message (Step S804). Next, the processor further determines whether the wait time (T) exceeds a predetermined threshold (Tth) (Step S805). When the wait time (T) is determined to have exceeded the predetermined threshold (Tth), the processor transmits an information request message to request a unicast of the interested system information from the base station (Step S806) and receives the corresponding system information (Step S807). On the other hand, when the wait time (T) is determined to have not exceeded the predetermined threshold (Tth), the processor directly receives the corresponding system information broadcasted by the base station at the corresponding time instances (Step S807). It is noted that according to another embodiment of the invention, when there is no indication message received by the mobile device, the corresponding wait time may not be needed be calculated, and the steps S804 and S805 may be skipped, and step S806 may be optionally performed. After the network registration procedure has been completed, the processor negotiates idle mode parameters with the base station and enters an idle mode to save power (Step S808). According to an embodiment of the invention, when the base station receives many information request messages requesting for the same system information within a time interval, the base station may choose a more robust MCS for the system information to be transmitted for the next time. According to another embodiment of the invention, when the mobile device enters an idle mode for low power consumption, the processor (e.g. 134) may further determine necessity of one or more network-entry-related and non-network-entry-related bit streams. The processor may selectively wake up to receive the network-entry-related and non-network-entry-related bit streams at the corresponding transmission time instance when necessary. Thus, battery power of the mobile device may be further saved. According to the embodiment of the invention, with or without the indication message, the proposed scheme is capable of providing shorter access latency, as compared to current 802.16e DCD/UCD.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for transmitting a plurality of system information bit streams, wherein each system information bit stream carries corresponding system information of one or more base stations in a wireless communication system, comprising:
   identifying a plurality of network-entry-related bit streams and a plurality of non-network-entry-related bit streams from the system information bit streams, wherein the network-entry-related bit streams carry essential system information for a terminal to access a network through at least one of the base stations, and wherein the network-entry-related bit streams are categorized into one group and the non-network-entry-related bit streams are categorized into the other group;
   modulating the network-entry-related bit streams according to a first set of modulation and coding schemes (MCSs) and modulating the non-network-entry-related bit streams according to a second set of MCSs, wherein each of the first set of MCSs and the second set of MCSs comprise one or more MCSs, respectively; and
   transmitting the system information bit streams with different frequencies, wherein the network-entry-related bit streams and the non-network-entry-related bit streams are transmitted as being broadcasted, the network-entry-related bit streams are periodically transmitted according to a first predetermined period, the non-network-entry-related bit streams are transmitted according to a second predetermined period, and the second predetermined period is longer than the first predetermined period.

2. The method as claimed in claim 1, wherein the first set of MCSs comprises at least one MCS, which is different from MCSs in the second set of MCSs.

3. The method as claimed in claim 1, wherein at least one MCS of the first set of MCSs defines a first bit rate lower than a second bit rate defined by at least one MCS of the second set of MCSs.

4. The method as claimed in claim 1, wherein the non-network-entry-related bit streams are transmitted periodically.

5. The method as claimed in claim 1, further comprising: transmitting the non-network-related bit streams in a non-periodically manner.

6. The method as claimed in claim 1, further comprising:
   determining corresponding transmission time instances for each non-network-entry-related bit stream in an indication message;
   periodically transmitting the indication message according to an indication period; and
   transmitting the non-network-entry-related bit streams at the corresponding transmission time instances.

7. The method as claimed in claim 1, wherein the first set of MCSs and the second set of MCSs are adaptively changed according to a condition of cell-planning, terminal locations, or terminal feedbacks.

8. The method as claimed in claim 1, further comprising:
   obtaining a preferred broadcast period for each non-network-entry-related bit stream;
   identifying at least one low-rate bit stream from the non-network-entry-related bit streams according to the preferred broadcast period, wherein the preferred broadcast period of the low-rate bit stream exceeds one super-frame; and
   transmitting the low-rate bit stream in response to reception of a corresponding information request message from the terminal.

9. The method as claimed in claim 8, further comprising:
   identifying at least one high-rate bit stream and at least one medium-rate bit stream from the non-network-entry-related bit streams according to the preferred broadcast period, wherein the preferred broadcast period of the high-rate bit stream is based on one frame unit and the preferred broadcast period of the medium-rate bit stream is based on one super-frame unit, and wherein the preferred broadcast period of the high-rate bit stream is shorter than that of the medium-rate bit stream and the preferred broadcast period of the medium-rate bit stream is shorter than the preferred broadcast period of the low-rate bit stream; and
   periodically transmitting the high-rate bit stream, the medium-rate bit stream, and the low-rate bit stream according to the corresponding preferred broadcast period.

10. The method as claimed in claim 9, further comprising:
    modulating the high-rate bit stream, the medium-rate bit stream and the low-rate bit stream according to different MCSs.

11. The method as claimed in claim 1, further comprising:
    transmitting one network-entry-related bit stream via more than one base station in the network at the same time instance and same radio frequency.

12. A method for transmitting a plurality of system information bit streams, wherein each system information bit stream carries corresponding system information of one or more base stations in a wireless communication system, comprising:
    obtaining a preferred broadcast period for each system information bit stream;
    identifying at least one high-rate bit stream and at least one low-rate bit stream from the system information bit streams according to the preferred broadcast period, wherein the preferred broadcast period of the high-rate bit stream is based on one frame unit and the preferred broadcast period of the low-rate bit stream is based on multiple super-frames unit; and
    modulating the high-rate bit stream according to a first set of modulation and coding schemes (MCSs) and modulating the low-rate bit stream according to a second set of MCSs, wherein the first set of MCSs and the second set of MCSs comprises at least one MCS, respectively, and at least one MCS of the first set of MCSs defines a first bit rate lower than a second bit rate defined by at least one MCS of the second set of MCSs.

13. The method as claimed in claim 12, wherein at least one MCS in the first set of MCSs is different from at least one MCS in the second set of MCSs.

14. The method as claimed in claim 12, further comprising: unicasting the low-rate bit stream in response to reception of a corresponding information request message from a terminal in the wireless communication system.

15. The method as claimed in claim 12, further comprising: identifying at least one medium-rate bit stream from the system information bit streams according to the preferred broadcast period, wherein the preferred broadcast period of the medium-rate bit stream is based on one super-frame unit; and
modulating the medium-rate bit stream according to a third set of MCSs, wherein at least one MCS in the third set of MCSs is different from at least one MCS in the first set or the second set of MCSs.

16. A communication apparatus capable of providing a network in a wireless communication system, comprising:
a memory storing a plurality of network-entry-related bit streams that carry essential system information for a terminal to access the network through the communication apparatus, and a plurality of non-network-entry-related bit streams; and
a processor coupled to the memory, modulating the network-entry-related bit streams according to a first set of modulation and coding schemes (MCSs), modulating the non-network-entry-related bit streams according to a second set of MCSs, transmitting the network-entry-related bit streams according to a first predetermined period and transmitting the non-network-entry-related bit streams according to a second predetermined period, wherein the network-entry-related bit streams and the non-network-entry-related bits streams are transmitted as being broadcasted, the second predetermined period is longer than the first predetermined period and the first set of MCSs and the second set of MCSs comprise at least one MCS, respectively, and wherein the network-entry-related bit streams are categorized into one group and the non-network-entry-related bit streams are categorized into the other group.

17. The communication apparatus as claimed in claim 16, at least one MCS of the first set of MCSs defines a first bit rate lower than a second bit rate defined by at least one MCS of the second set of MCSs.

18. The communication apparatus as claimed in claim 16, wherein the processor further periodically transmits the non-network-entry-related bit streams.

19. The communication apparatus as claimed in claim 16, wherein the processor further obtains and schedules corresponding transmission time instances for each non-network-entry-related bit stream in an indication message, periodically transmits the indication message according to an indication period, and transmits the non-network-entry-related bit streams at the corresponding transmission time instances.

20. The communication apparatus as claimed in claim 16, wherein the processor further obtains a preferred broadcast period for each non-network-entry-related bit stream, identifies at least one low-rate bit stream with a corresponding preferred broadcast period exceeding one super-frame from the non-network-entry-related bit streams, and transmits the low-rate bit stream in response to reception of a corresponding information request message from the terminal.

21. The communication apparatus as claimed in claim 20, wherein the processor further identifies at least one high-rate bit stream and at least one medium-rate bit stream from the non-network-entry-related bit streams according to the preferred broadcast period, and periodically transmits the high-rate bit stream and the medium-rate bit stream according to the corresponding preferred broadcast period, and wherein the preferred broadcast period of the high-rate bit stream is shorter than that of the medium-rate bit stream.

22. A communication apparatus, comprising:
a radio transceiver module; and
a processor receiving a plurality of network-entry-related bit streams and a plurality of non-network-entry-related bit streams via the radio transceiver module, and demodulating the received network-entry-related bit streams according to a first set of modulation and coding schemes (MCSs) and demodulating the received non-network-entry-related bit streams according to a second set of MCSs, wherein the network-entry-related bit streams and the non-network-entry-related bit streams are transmitted as being broadcasted and a first predetermined period for transmitting the network-entry-related bit streams is shorter than a second predetermined period for transmitting the non-network-entry-related bit streams, wherein the network-entry-related bit streams carry essential system information for the communication apparatus to access a network through at least one base station, and wherein the network-entry-related bit streams are categorized into one group and the non-network-entry-related bit streams are categorized into the other group.

23. The communication apparatus as claimed in claim 20, wherein the processor further transmits an information request message to a base station to request a unicast of a non-network-entry-related bit stream.

24. The communication apparatus as claimed in claim 23, wherein the processor further receives at least one indication message comprising information indicating corresponding transmission time instances for the non-network-entry-related bit streams, obtains a wait time of the non-network-entry-related bit stream according to the corresponding transmission time instance indicated in the indication message, and transmits the information request message when the wait time is determined to be longer than a predetermined threshold.

25. The communication apparatus as claimed in claim 22, wherein the processor further receives multiple network-entry-related and non-network-entry-related bit streams carrying the same system information at different time instances, combines the received system information bit streams by using a combining technique to obtain a combined bit stream and decodes the combined bit stream to obtain the carried system information.

26. The communication apparatus as claimed in claim 22, wherein when the processor enters an idle mode for low power consumption, the processor further determines necessity of at least one non-network-entry-related bit stream, and selectively wakes up to receive the network-entry-related and non-network-entry-related bit stream at the corresponding transmission time instances according to necessity.

27. The communication apparatus as claimed in claim 22, wherein the processor further respectively receives a same network-entry-related bit stream from a plurality of base stations, combines the received network-entry-related bit streams to obtain a combined bit stream, and decodes the combined bit stream to obtain the carried system information.

* * * * *